Aug. 17, 1926.
E. A. DEWEY
1,596,406
LID HANDLING MECHANISM
Filed April 16, 1923   2 Sheets-Sheet 1
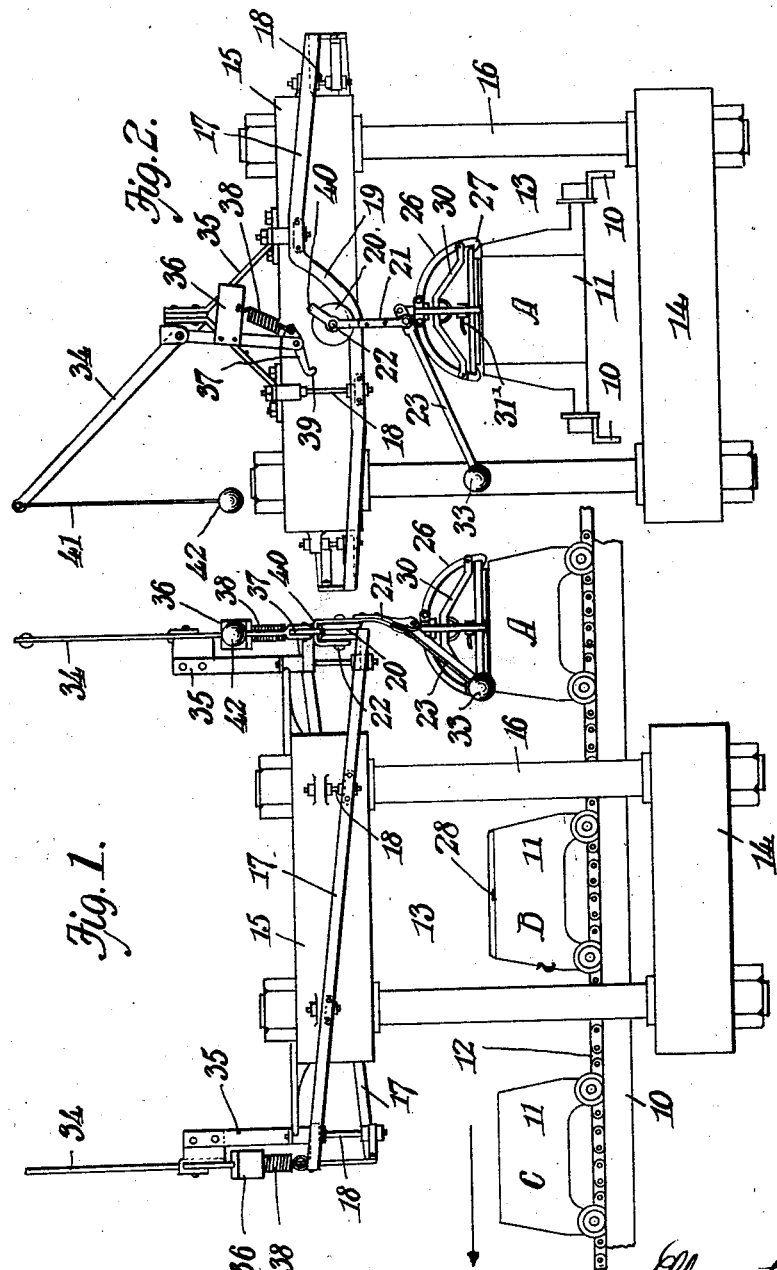

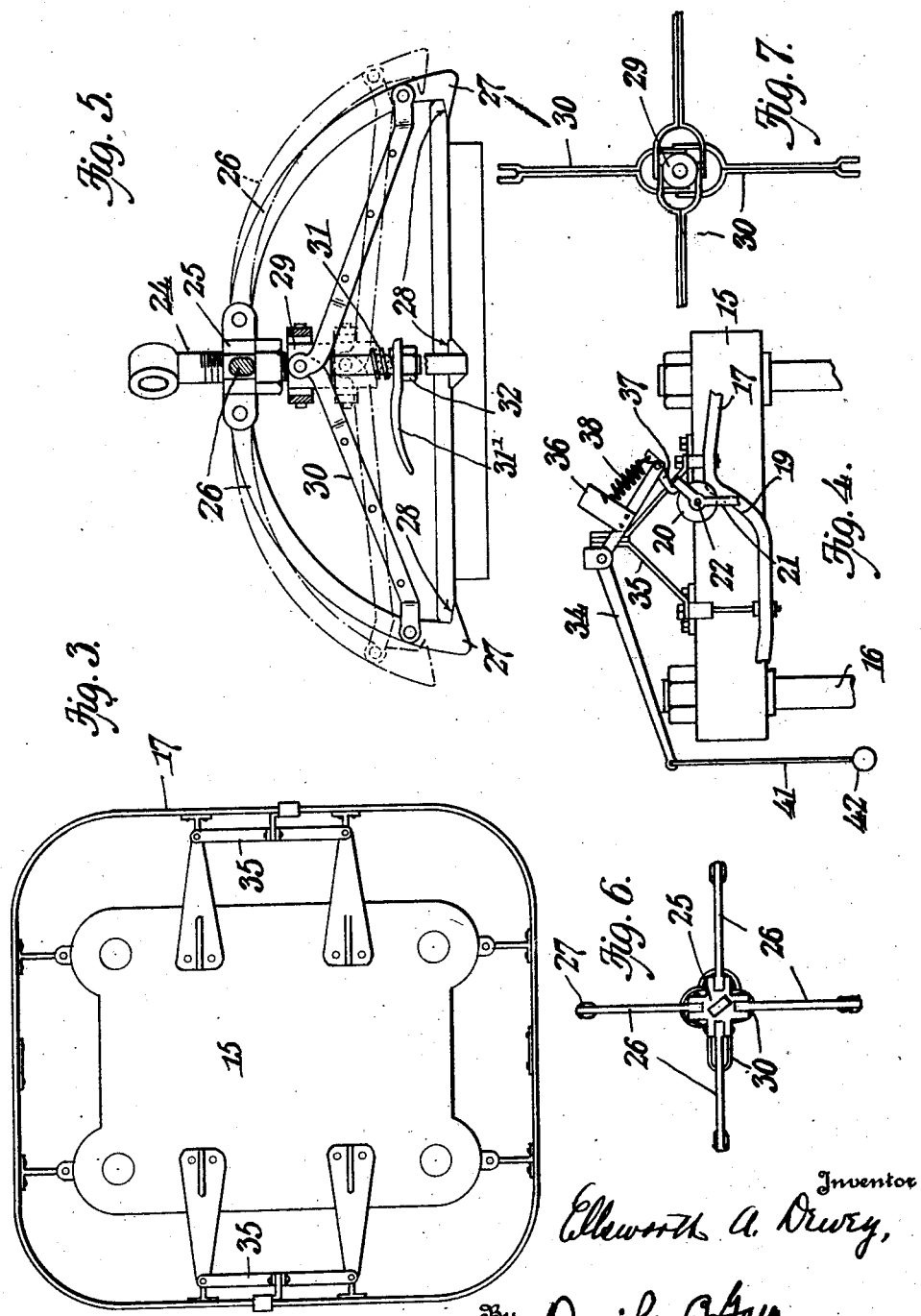

Patented Aug. 17, 1926.

1,596,406

UNITED STATES PATENT OFFICE.

ELLSWORTH A. DEWEY, OF MIAMI, FLORIDA.

LID-HANDLING MECHANISM.

Application filed April 16, 1923. Serial No. 632,476.

This invention relates to plastic block making machinery, and has particular reference to the machine disclosed by my Patent No. 1,346,640, dated July 13, 1920.

The said patent discloses a mobile mechanism for making blocks of plastic material, and wherein a plurality of molds are carried in spaced relation upon a conveyor or belt which travels intermittently lengthwise of the carriage. At one end of the machine, the molds, as they arrive successively and stop, are filled with the plastic material of which the blocks are to be formed, and as the molds advance from this filling position and halt at regular intervals, various operations are performed. One operation consists in applying pressure to the contents of the molds to properly form the blocks, and a hydraulic press is employed for this purpose. At the stage just prior to the entry of a mold to the press, a lid or cover is applied to the mold to prevent the contents thereof spilling out during the pressing operation, and to impress or shape the block in formation. The lid or cover for the mold is removed therefrom after the mold passes beyond the press, and is then taken back to the position in advance of the press to be again used, as will be understood.

The primary object of the present invention is to facilitate handling of these covers or lids; for applying them to the molds just prior to the pressing operation, and for removing them therefrom after pressure has been applied and taking them back to the applying position. These several operations are carried out in a semi-automatic manner, as will be apparent from the following description.

In the drawings:

Fig. 1 is a side elevation of a part of the block making machine as disclosed by the above mentioned patent and illustrating as applied thereto lid or cover transferring and applying mechanism constructed in accordance with the invention, Fig. 2 is an end view of the mechanism shown in Fig. 1, Fig. 3 is a plan view of the press head and showing the track for the lid carrier, Fig. 4 is a fragmentary view similar to Fig. 2, and showing the parts in the position they will assume just prior to the release of the carrier, Fig. 5, is an enlarged side elevation, parts in section, of the grapple used in holding the lids, Fig. 6 is a plan view of the grapple, and Fig. 7 is a fragmentary plan view of the grapple spreading yokes.

Referring now more particularly to the drawings, 10 represents a track upon the block making machine, upon which the molds 11 travel in their course from one end of the machine to the other; this motion being imparted to the several molds by the endless chain 12 to which the molds are connected. The molds are spaced equal distances apart upon the chain 12, and arrive successively at their several positions of rest, in order to permit of various operations taking place. One of these operations, as before stated, is the application of pressure to the contents of each mold, and this is performed by the press indicated generally at 13. Only so much of the machine as is necessary to a clear understanding of the present improvement is shown, and many of the operative parts of the press are omitted. The press includes a base 14 and a head 15, connected by the posts 16.

As each mold arrives within the press and halts beneath the power plunger, so that the latter may operate upon the contents thereof, the next adjacent mold on one side of the press will be in position to have its cover or lid applied prior to its entry to the press, while the mold which has just vacated the press will be in position to have its lid or cover removed. In Fig. 1 of the drawings, the mold A is in lid applying position; the mold B is in pressing position; and mold C has been through the press and has had its lid or cover removed and carried back to be applied to another on-coming mold.

The mechanism for carrying out this operation includes a track 17 secured upon the head 15 of the press and encircling the same. This track is secured to the press head in any preferred manner; adjustable rods or stems 18 being employed in the present instance so that accurate positioning and inclination of the track may be effected. The track 17, on one side of the press, inclines downwardly toward the rear end of the press, while the track upon the opposite press side inclines in an opposite direction. A carrier upon the track starting above the position A will automatically travel to the lowest point in the track over the position C, while a carrier starting above position C will travel in a forward direction until it reaches the lowest part of the track above the point A. The highest and lowest points or portions of the track 17 are connected by the sharply inclined or abrupt portions 19, which act as stops for the carriers.

One or two carriers may be used upon the track; one being shown herein for convenience. The carrier comprises a sheave or groove wheel 20 resting upon the track 17, and from which depends a hanger 21. This hanger comprises a metallic bar hooked at one end to pass over the sheave, and the latter is rotatably mounted in this bar as at 22. The lower end of the bar or hanger may be bifurcated, or may have an additional plate or bar attached thereto as shown, so as to provide spaced arms or members between which the inner end of a lever 23 is pivoted.

The short outwardly protruding end of the lever 23 is pivotally connected with the upper end of a grapple staff or post 24, near the upper end of which is secured a head 25, to which the inner ends of grapple arms 26 are pivotally connected. These arms, four in number, radiate from the head, and curve downwardly toward their free ends and inwardly to provide hooks or fingers 27 to engage beneath the edges of the lid or cover of the mold and to hold the same when the grapple is moved. The edges of the lids may be cut away or recessed as at 28 on their under sides to enable the fingers 27 to wedge beneath the same to assist in the grapple securing a firm grip upon the lids.

The lower portion of the grapple staff or post slidably carries a block 29, to which the inner ends of spreading yokes 30 are pivoted. These yokes, four in number, are pivoted at their outer extremities to the lower or outer portions of the grapple arms 26, and it is obvious, therefore, that as the block 29 is raised or lowered upon the post 24, the grapple arms will be caused to move inwardly or outwardly. When the block 29 has been lowered, the lower ends of the grapple arms will have been moved out sufficiently far to permit the grapple being raised without affecting the lid or cover, while when the block 29 is raised, the fingers of the arms will be caused to move inwardly and wedge beneath the cover and firmly hold the same. The lower extremity of the post 24 has secured thereto a handle for convenience in operating the device, and an expansion spring 31 encircles the post and rests upon the inner portion of this handle. A nut 32 holds the handle 31¹ and the spring 32 in position.

The outer end of the lever 23 has a weight 33 applied thereto, and this lever is so weighted and fulcrumed as to overbalance the grapple and normally hold it in raised position, with a lid held thereby.

By reason of the inclined tracks, as before described, the carrier will normally gravitate to one or the other of the low positions of the track, and these positions are directly above the positions A and C of the block forming machine. Assuming it is desired to apply the lid to the mold in lid receiving position, as shown in Fig. 1 of the drawings, the operator with one hand raises the lever 23 until the grapple places the lid held thereby upon the mold. In steadying and guiding the grapple, the operator grasps the handle 31¹, and in so doing his arm extends over one of the yoke members 30 of the grapple spreading means. When low position of the grapple has been reached, the operator presses downwardly upon one of these yokes with his arm, and this pressure causes the block 29 to be depressed and the several yokes correspondingly lowered, whereupon the grapple arms will move outwardly and the hooks or fingers thereof will become disengaged from the lid. When the operator releases the yokes, the spring 31, which became compressed when the block 29 was lowered, will give impetus in an upward direction to the said block, whereupon the yokes will assume normal position as will the grapple arms. The carrier is then caused to travel around to the rear end of the press, where it comes to a stop directly above the mold in position C.

When it is desired to remove a lid from its mold after the pressing operation, the yokes 30 are depressed in the manner above stated, and at the same time the short-fulcrumed lever 23 is raised. Lowering of the yoke block causes the grapple arms to spread, while raising of the lever causes the entire grapple to move down to a position that will allow the fingers of the grapple arms to engage beneath the lid. When the position has been reached, the yokes and the lever are both released, whereupon the fingers pass beneath the edges of the lid and at once disengage the latter from the mold, while the grapple itself moves upwardly so that the lid will clear the top of the mold. When in this position, the carrier is ready to pass around to the lid applying position, the lid being securely held during such movement.

The means provided for assisting in this transfer of lids includes a lever 34 pivoted inwardly from its ends to a brackt 35 secured to the press head; it being understood that one each of these devices is located at each end of the press. The lever 34 has its lower end disposed above the track 17 over the lower portion thereof, and a weight 36 normally holds the lever in this position. The lower extremity of this lever has pivoted thereto a latch or hook member 37, to the forward end of which is connected one end of a contractile spring 38; the opposite end of the spring being secured to the weight 36. This spring normally holds the latch with its hook 39 in position to engage with the loop portion 40 of the sheave hanger 21 when the upper end of the lever 34 is moved downwardly. The lever 34 is mounted in such manner that when downward-movement of its upper end occurs, the lower portion of the lever moves toward and in the direction of inclination of the abrupt portion of the track 17. In so traveling, the hook of the latch member engages with the loop of the grapple hanger and causes the carrier to be lifted up the inclined portion 19 of the track. When the limit of this movement is reached, the spring 38, which will have become tensioned as the lever was carrying out the lifting operation, will give momentum to the carrier; the weight of the carrier having been relieved from the latch due to the arrival of the sheave upon level track, as will be understood. The loaded carrier at once follows the track 17 around to the opposite end of the press, where it automatically comes to a stop. The upper end of the lever 34 has secured thereto a cord or wire 41, to the lower end of which may be attached a hand grip in the form of a ball 42, as shown.

From the foregoing, it is apparent that I have provided a lid handling apparatus which will prove highly efficient in the operation of block making machines of the character mentioned, and which will greatly simplify the operations of applying and removing the lids or covers of the molds. It will be understood, of course, that variations in the details of construction of the several parts may be resorted to if desirable without departing from the spirit of the invention as defined by the claims.

Having thus described my invention, I claim:

1. In a device of the class described, the combination with spaced molds and a removable cover therefor, of a carrier adapted to grip and lift the cover from one of said molds and adapted alternately to move said cover from one to the other of said molds and to release the same when directly above the other mold.

2. In a device of the class described, the combination with spaced molds, of a plate releasably covering one of said molds, and a carrier adapted to grip and to lift said plate from its mold and to convey the same to a position directly above another mold and to release the same.

3. In a device of the class described, the combination with spaced molds, of a carrier movable over each of said molds, a continuous inclined track supporting said carrier and having low and high portions, and means for lifting said carrier from the low to the high portions of said track.

4. In a device of the class described, the combination with spaced molds, of an annular inclined track disposed above said molds, a carrier mounted on said track and adapted to move over said molds, and means for raising said carrier from a lower to a higher point in said track.

5. In a device of the class described, an inclined track having an abrupt portion therein connecting the lower with the higher portions of the track, a carrier on said track, means for lifting said carrier over said abrupt portion, and means operating after said lifting operation to give momentum to said carrier.

6. In a device of the class described, an inclined track, having an abrupt portion therein connecting the lower with the higher portions of the track, a carrier on said track, means for lifting said carrier over said abrupt portion, and means carried by said lifting means for giving momentum to said carrier after the lifting operation.

7. In a device of the class described, an inclined track having an abrupt portion therein connecting the lower with the higher portions thereof, a carrier on said track, means for lifting said carrier over said abrupt portion, means for imparting movement to said carrier after said lifting operation, and the said movement imparting means being empowered by operation of said lifting means.

8. In a device of the class described, a support, a track encircling said support, an abrupt portion in said track connecting the lower and the higher parts thereof, a carrier on said track, an arm pivoted above said track adjacent to said abrupt portions and adapted to swing toward the higher portion of the track, a loop on said carrier, and a hook carried by said arm and adapted when the arm is moved in one direction to engage with said loop and lift the carrier over said abrupt portion.

9. In a device of the class described, a bracket, an arm pivoted in said bracket, a weight on said arm tending normally to maintain the arm in lowered position, a hook on the lower end of said arm, and a spring normally maintaining said hook in a predetermined position.

10. In a device of the class described, a support, a track encircling said support and inclined from one end to the other, an abrupt portion connecting the highest and lowest portions of said track, a carrier resting upon said track, a loop on said carrier, an arm pivoted above said lowest portion of the track and adapted to move in the direction of the highest point thereof, a latch pivoted inwardly from one end to the lower end of said arm, a hook on one end of said latch adapted when the arm is moved in one direction to engage with said loop, a weight on said arm above said latch, and a contractile spring connecting the opposite end of the latch with said weight.

11. In a device of the class described, a carrier, a grapple, a staff for said grapple, a lever pivoted near one end to said carrier, a pivotal connection between said staff and the short end of said lever, and the opposite end of said lever overbalancing said grapple.

12. In a device of the class described, a carrier, a grapple staff disposed in vertical position and connected with said carrier, a head affixed to the upper portion of said staff, grapple arms pivoted to said head and radiating therefrom, a block slidable on said staff beneath said head, an expansion spring at the lower end of said staff, adapted to be engaged and depressed by said block when the latter moves downwardly, and yoke members pivotally connected at their outer ends with said arms and at their inner ends with said block.

In testimony whereof, he affixes his signature.

ELLSWORTH A. DEWEY.